J. H. GOSS.
SOCKET CAP.
APPLICATION FILED MAY 29, 1913.

1,103,504.

Patented July 14, 1914.

WITNESSES

INVENTOR
John H. Goss
by W. N. Fussell
Attorney

UNITED STATES PATENT OFFICE.

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT.

SOCKET-CAP.

1,103,504.  Specification of Letters Patent.  Patented July 14, 1914.

Application filed May 29, 1913. Serial No. 770,733.

*To all whom it may concern:*

Be it known that I, JOHN H. GOSS, a citizen of the United States, residing at Waterbury, in the county of New Haven and State of Connecticut, have invented a certain new and useful Improvement in Socket-Caps, of which the following is a full, clear, and exact description.

This invention relates primarily to the means for securing the hub to the sheet metal caps of electric light sockets, and in its special application here illustrated it is in the nature of an improvement upon the invention forming the subject of Patent No. 985,246, dated February 28, 1911, and granted to the Scovill Manufacturing Company, as assignees of William McK. Black, who are also owners of the present invention. In the patent mentioned, the hub and cap are united by staking their juxtaposed flanges, but even exercising great care in so uniting them, these flanges are often split, and as a result the joint will not effectively resist the torsional strains to which the parts are subjected in the subsequent operations of manufacture and in use. The present invention is designed to prevent such splitting of the flanges and consequent weakness.

The invention consists of a socket cap in which the hub and cap are united by rolling over or expanding their respective juxtaposed flanges so as to firmly and rigidly unite the parts, secure against longitudinal and torsional strains, and without splitting or staking or breaking either of the flanges, all as I will proceed now to explain and finally claim.

Figure 1:
Figure 2:
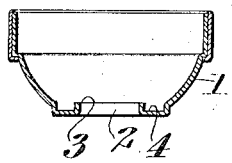
Figure 3:
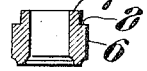
Figure 4:
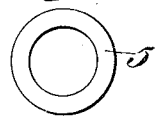
Figure 5:
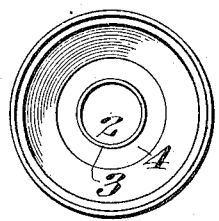
Figure 6:
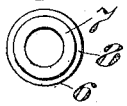
Figure 7:
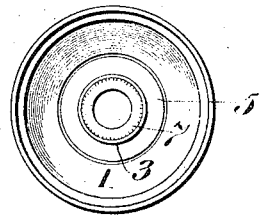
Figure 8:
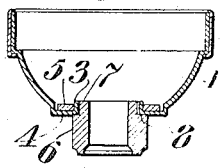
Figure 9:
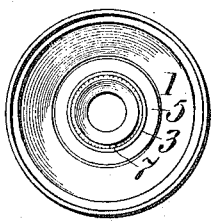
Figure 10:
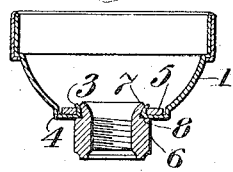
Figure 11:
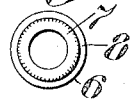

In the accompanying drawings illustrating the invention, in the several figures of which like parts are similarly designated, Figure 1 is a cross-section of the washer; Fig. 2 is a longitudinal section of the cap shell; Fig. 3 is a longitudinal section of the hub; Fig. 4 is a top plan view of the washer; Fig. 5 is a plan view of the cap shell, and Fig. 6 is a top plan view of the hub having a plain flange, all of which are constituent parts of the socket cap of this invention. Fig. 7 is a plan view, and Fig. 8 is a longitudinal section of the several constituent parts ready for assembling, but illustrating a hub having a knurled flange. Fig. 9 is a plan view, and Fig. 10 is a longitudinal section of the assembled parts as they appear in a finished cap. Fig. 11 is a top plan view of a hub having a knurled flange.

The shell 1, may be of any approved construction, excepting that its hub-receiving hole 2 is encircled by a substantially straight, inwardly extending flange 3 and around this flange is a recess 4 in the shell to receive the washer 5. The hub 6 may be of any approved construction, but provided with a flange 7 and a shoulder 8; and as indicated in Figs. 7, 8, 9 and 11, the periphery of the flange 7 may be knurled, milled or toothed, so as to afford a better grip on the flange 3 of the shell. These parts, namely, the shell and hub, are assembled substantially as indicated in Figs. 7 and 8, with the flanges 3 and 7, respectively on the shell and the hub, juxtaposed in a more or less intimate contact, and with the washer 5 in the recess 4, and then by means of a suitable tool or suitable tools the flange 7 is expanded so that it will expand the flange 3 coextensively, and the two thus expanded flanges will grip the surrounding washer 5. Such expanding tools are used as will preclude the splitting of the flanges, and will serve to retain both flanges in whole, that is to say unbroken condition, to thereby conserve their original strength to resist longitudinal and torsional strains to which the parts are subjected in the subsequent operations of manufacture and in use. As shown in Figs. 9 and 10, the flanges may be expanded without splitting or breaking the metal, and a smooth and symmetrical joint be made; and it is to be particularly noted that because the shell flange 3 is not broken, the joint has a maximum resistance against torsional strains.

The joint is formed by means of a round punch, which tends to draw the metal of the two flanges and the washer together and roll over the upper edges of the flanges in extremely close contact with one another and the washer, in a rounded manner, without breaking or splitting them. The knurled periphery of the hub-flange assists in the grip of the flanges on one another, because the parts are so made that they fit each other reasonably close before the final closing of the joint.

The described closure or joint, combining the described fit of the washer, shell and hub to each other, and the described knurled periphery on the hub, is an improvement over the closure or joint described in Patent No. 985,246, because stronger to resist not only the longitudinal strains and the torsional strains to which the completed article is subjected in use, but also because it more effectively resists the same strains to which the article is subjected in the operations of its manufacture subsequent to that of closing, and especially to that of tapping the thread in the hub after the closure or joint is formed.

What I claim is:—

1. A socket cap, comprising a shell having a hub-hole, an inwardly projecting flange encircling such hole, and a recess surrounding the flange, a washer arranged in said recess and embracing the flange, and a hub having a flange fitted in said hub-hole, the hub flange and the shell flange conjointly rolled over against the washer in a smooth, rounded and whole condition, thereby uniting the shell and hub so as to effectively resist longitudinal and torsional strains.

2. A socket cap, comprising a shell having a hub-hole, an inwardly projecting flange encircling such hole, and a recess surrounding the flange, a washer located in said recess and in close contact with the flange, and a hub having a knurled flange closely fitting the hub-hole and in intimate contact with the shell-flange, the flanges of the shell and the hub being turned over together and over upon the washer thereby avoiding breaking or staking the metal of the flanges.

In testimony whereof I have hereunto set my hand this 28th day of May, A. D. 1913.

JOHN H. GOSS.

Witnesses:
 CLARA L. DODGE,
 MARGARET E. LEGGETT.